March 23, 1954
C. C. ANTHES
2,672,924
BLOWPIPE WITH ROTATABLE LOCKING COLLAR
FOR QUICKLY DETACHABLE HEAD
Filed April 18, 1952
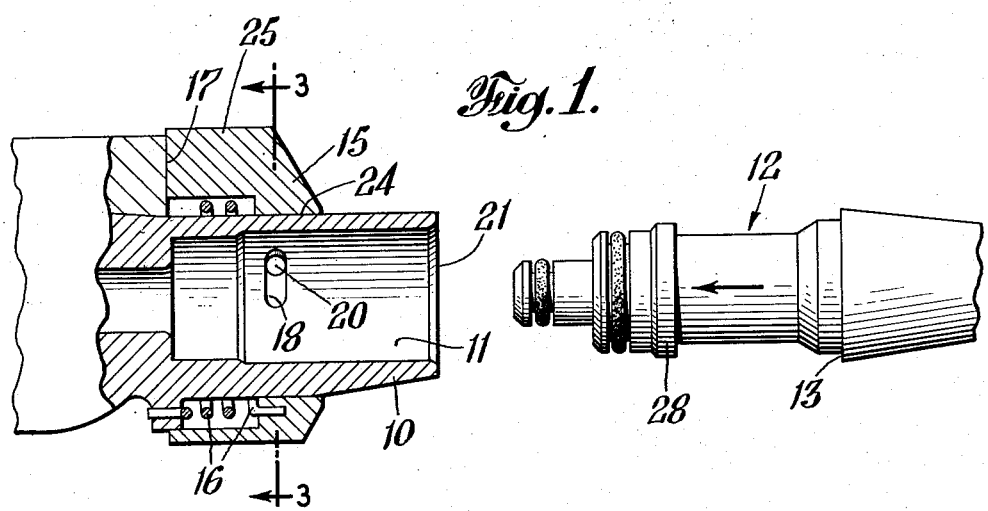
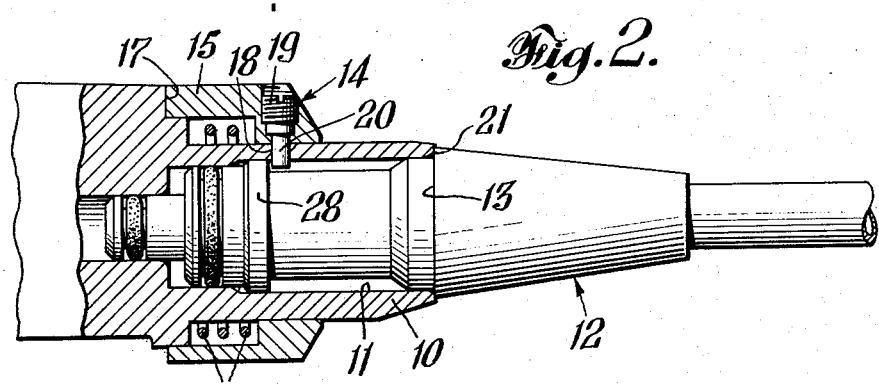
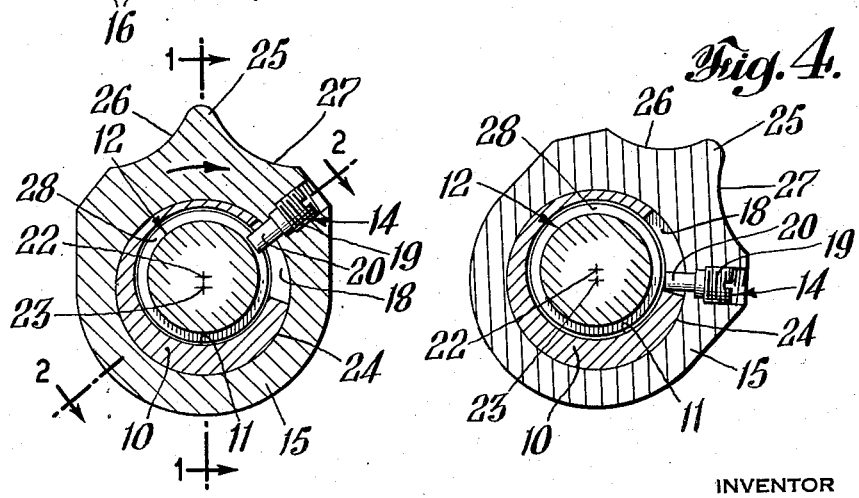
INVENTOR
CLIFFORD C. ANTHES
BY
*DC Harrison*
ATTORNEY Patented Mar. 23, 1954

2,672,924

UNITED STATES PATENT OFFICE 2,672,924

BLOWPIPE WITH ROTATABLE LOCKING COLLAR FOR QUICKLY DETACHABLE HEAD

Clifford C. Anthes, Union, N. J., assignor to Union Carbide and Carbon Corporation, a corporation of New York Application April 18, 1952, Serial No. 283,054

6 Claims. (Cl. 158—27.4)

An object of this invention is to provide a blow pipe with quickly detachable connection for a push-in and pull-out type head in which said connection has a locking collar which is simple in construction, inexpensive to manufacture and easy to replace.

A rotatably adjustable quickly detachable push-in and pull-out type head for a blowpipe has been provided with a locking collar which is rotatable by an operator's thumb a half turn or less to move a locking detent to a position for removal of the head. On insertion of the head after such angular movement of the locking collar to allow full insertion of the head, a spring carried by the collar has biased the collar to its locking position. One such locking collar for that type head is shown in the patent to Jacobsson 2,518,895, dated August 15, 1950. A practical difficulty with blowpipes of this type is the fact that the locking collar sometimes has to be removed for cleaning or replacement after breakage or injury in the rough treatment to which a blowpipe may be subjected. Use of the blowpipe in sandy country may cause sand to become clogged within the collar grooves, obstructing movement of the locking balls. Thus, from a variety of causes it has been found necessary sometimes to remove such a locking collar, although that has not been found necessary in the ordinary use of the blowpipe.

Specifically, the object of this invention is accomplished by providing a blowpipe with a locking collar having a cam actuated locking pin. Instead of incurring the expense of cutting cam grooves in the collar or elsewhere, the surface on which the collar rotates has been formed eccentric to the removable head. A transverse slot has been cut in this surface and the locking pin given a freely sliding fit in this groove for not only its locking and unlocking function but also the pin functions to retain the collar against longitudinal movement, and requires no radially inwardly spun flange that is difficult to remove for removal of the collar. To remove the collar in this invention, it is only necessary to back off the pin which is threaded in the collar.

Referring to the drawing:

Fig. 1 is a section on the line 1—1 of Fig. 3 and shows a longitudinal section through the rotatable locking collar for receiving the push-in type head shown at the right of Fig. 1, not in section.

Fig. 2 is a section on the line 2—2 of Fig. 3 with the head locked in place by the collar.

Fig. 3 is a section on the line 3—3 of Fig. 1.

Fig. 4 is a view corresponding to Fig. 3 except that the locking collar is there shown rotated to an unlocked position in which the removable head may be quickly pulled out from the blowpipe.

The body end portion 10 of a blowpipe is provided with an eccentric socket 11 for reception of the quickly detachable push-in and pull-out type welding head 12 provided with a shoulder 13 that abuts the outer end portion of the body 10. Any well known type head may be used but that illustrated in the present invention is one in which the mixing of gaseous fuel and oxidizing gas takes place within the head. To retain the head in its locked position, the pin 14 carried by the collar 15 projects radially inwardly far enough to engage a flange portion of the head. The collar 15 is rotatable through approximately 45° or enough for the pin to be withdrawn from engagement with the head in the position shown in Fig. 4 for withdrawal of the head. The collar 15 rotates on the blowpipe body end portion 10 which has the socket 11 eccentric to the outer cylindrical surface of the body portion 10, so that with the collar and pin in the position shown in Fig. 3 the pin projects inwardly enough to prevent removal of the head, yet in the position shown in Fig. 4 the head may be withdrawn. To bias the collar 15 to a locked position the usual spring 16 engages both the collar and blowpipe body for that purpose. When the operator rotates the collar he moves it against the action of the spring 16.

The collar 15 engages the abutment wall 17 on the blowpipe. A transverse slot 18 in the body 10 is of sufficient angular extent to enable the locking pin 14 to be rotatable with the collar from its locked to unlocked position of the collar and pin. The locking pin 14 is provided with a threaded portion 19 and a reduced end portion 20, the threaded portion enabling the pin to be in threaded engagement with the collar.

The outer end portion of the blowpipe engaged by the abutment 13 of the head is designated by the numeral 21. The axis of the generally cylindrical end portion 10 of the blowpipe is designated by the numeral 23, whereas the axis of the socket 11 is designated by the numeral 22. The collar 15 rotates about the axis 23 on the outer generally cylindrical surface 24 of the body 10. As shown in Figs. 3 and 4, the collar is provided with a projection 25 on each side of which is a thumb engaging groove 26 and 27, enabling a right-handed operator to have his thumb in the groove 26 for rotating the collar against the action of the spring 16 to the unlocked position shown in Fig. 4. A left-handed operator may find it more convenient to have his thumb in the groove 27.

As shown in Fig. 2, a flange 28 on the removable head is adapted to be engaged by the locking pin 14 to prevent removal of the head. This head is provided with the usual gas passages and O ring packing which are not described because they form no part of the present invention. When the collar is in its locked position, the pin 14 projects about .025" below the circumference of the flange 28, and when the collar has been rotated the desired amount to the unlocked position of Fig. 4, the pin clears the flange 28 to allow the head to be pulled out.

Among the advantages of this invention may be mentioned the ease and facility with which the removable head is quickly insertable and locked in position in the blowpipe. The locking pin 14 is functionally integral with the locking collar 15. To assemble the blowpipe and collar it is only necessary to put the collar in place, then screw in the pin until the shoulder illustrated between the threaded portion and the reduced end portion is seated when the pin projects through the slot 18 and functions not only as a locking pin but also to keep the collar 15 in position longitudinally against being moved out of place. In the improved blowpipe, the body 10 is of stainless steel and the collar 15 is of an aluminum alloy. The construction is so assembled that it has been estimated the saving in time in assembly of the collar and its locking detent on a blowpipe is approximately 200% greater than is the time needed to assemble a locking collar having a locking ball and less close tolerances are needed in the present invention than in that former type. It has been found that a blowpipe does have to be disassembled occasionally in desert country, for example, when blowing sand may get under the collar, or in case of dirt from other causes, or in case of fracture. For this reason, assembly of the locking collar and its removal are important advantages to the operator of a blowpipe. To remove the collar in the present invention, it is only necessary to unscrew the threaded portion 19 of the pin 14 and back it off until the reduced portion 20 clears the slot 18. The head of the pin is provided with a slot, as shown in Figs. 2 to 4, in which a screwdriver is applicable for quick assembly and disassembly of the collar and pin.

What is claimed is:

1. In a blowpipe of the type having a quickly detachable push-in and pull-out type rotatably adjustable head, a rotatable locking collar for holding said head locked to the blowpipe body end portion against removal in one position of said collar and with said head removable in another position of the collar, a spring within said collar cooperating with the blowpipe body and with said collar for biasing said collar to its position in which said head is locked against removal, said body end portion cooperating with a shoulder on said head to limit inward movement of said head into the body end portion, a flange on a portion of the head inserted in said body end portion, and a locking detent carried by said collar for cooperation with said flange to retain said head in a locked position of said collar to prevent withdrawal of said head, the combination therewith of the improvement enabling said collar to be readily assembled on the blowpipe body end portion and removed therefrom with ease and facility for replacement or servicing, said improvement including the blowpipe body end portion on which the collar is rotatable having an outer surface which is eccentric to said head and provided with an arcuate transverse slot longitudinally intermediate the end faces of said collar, said locking detent comprising a pin fixed with respect to said collar and being of a length to extend through said slot and engage said flange to prevent withdrawal of said head in a position in which the collar locks said head but short enough to clear said flange and allow withdrawal of said head when said collar has been rotated against the action of its spring to an unlocked position, said pin having a freely sliding fit within said slot and retaining said collar against longitudinal movement with respect to said blowpipe body end portion on which it is mounted.

2. A blowpipe according to claim 1 in which said transverse slot is only long enough to allow a movement of the pin and collar of about 45°.

3. A blowpipe according to claim 2 in which said pin projects about .025 of an inch below the circumference of said flange in locking position and the eccentricity of the body outer end portion outer surface with respect to the axis of said head is about .10 of an inch.

4. A blowpipe according to claim 1 in which said pin is threaded into said collar.

5. A blowpipe according to claim 4 in which the portion of the pin projecting radially inwardly of said collar is of reduced diameter with respect to the threaded portion of the pin and said collar has a threaded pin receiving recess with a seat at its base through which the reduced portion of the pin projects.

6. A quickly detachable connection comprising male and female members, the female member having a portion of its outer surface eccentric with respect to the male member to provide a cam surface, a locking collar relatively rotatable on such outer surface, a pin fixed with respect to the collar and projecting beneath said cam surface, said female member having a transverse slot receiving said pin, and a flange on the male member engaged by said pin to prevent withdrawal of the male member in locking position of the collar but allow the pin to clear said flange in an unlocked position for said collar.

CLIFFORD C. ANTHES.

References Cited in the file of this patent

UNITED STATES PATENTS

| Number | Name | Date |
|---|---|---|
| 457,781 | Josef | Aug. 18, 1891 |
| 1,125,067 | Cook | Jan. 19, 1915 |
| 1,568,295 | Schleicher | Jan. 5, 1926 |
| 2,518,895 | Jacobsson et al. | Aug. 15, 1950 |
| 2,544,712 | Miller | Mar. 13, 1951 |
| 2,587,838 | Green | Mar. 4, 1952 |
| 2,607,404 | Osterlind | Aug. 19, 1952 |